United States Patent [19]

Herold

[11] 4,267,909
[45] May 19, 1981

[54] UNILATERALLY ALTERNATING BACKLASH TORQUE LOCK

[75] Inventor: Horst Herold, Aschaffenburg, Fed. Rep. of Germany

[73] Assignee: Petri AG, Aschaffenburg, Fed. Rep. of Germany

[21] Appl. No.: 43,669

[22] Filed: May 30, 1979

[30] Foreign Application Priority Data

Jun. 7, 1978 [DE] Fed. Rep. of Germany ....... 2824947

[51] Int. Cl.³ .......................................... F16D 67/00
[52] U.S. Cl. .............................................. 192/8 C
[58] Field of Search ........................... 192/7, 4 R, 8 C

[56] References Cited

U.S. PATENT DOCUMENTS

| 823,971 | 6/1906 | Remondy | 192/8 C |
|---|---|---|---|
| 1,965,878 | 7/1934 | Briggs | 192/8 C |
| 3,110,380 | 11/1963 | Meyer et al. | 192/8 C |

FOREIGN PATENT DOCUMENTS

| 225636 | 9/1910 | Fed. Rep. of Germany . |
|---|---|---|
| 898103 | 11/1953 | Fed. Rep. of Germany . |
| 1284135 | 11/1968 | Fed. Rep. of Germany . |
| 1600218 | 3/1970 | Fed. Rep. of Germany . |
| 2247135 | 3/1974 | Fed. Rep. of Germany . |
| 918547 | 2/1963 | United Kingdom ............... 192/8 C |

Primary Examiner—George H. Krizmanich
Attorney, Agent, or Firm—Schwartz, Jeffery, Schwaab, Mack, Blumenthal & Koch

[57] ABSTRACT

Disclosed is a unilaterally alternating torque backlash lock mechanism that overcomes the disadvantages of prior art single part loop spring braking parts. The invention comprises a control element having a hub member and a housing member surrounding the hub member. The hub member is equipped with a sleeve curving at a distance around a bearing member (or inner hub member). The sleeve does not completely surround the bearing member, but rather displays a slot-like area running its entire length, thus forming a drive slot. A spring is wound around the bearing member and is so designed that each of the spring ends form a peg-like member bent down radially in the outward direction. Each of these peg-like members abut with some clearance against one of the edges of the slot in the sleeve on one side and against a cam-like member on the other side. The cam-like member is formed on the inside surface of the housing and is of sufficient dimensions to extend into the slot-like area of the sleeve.

8 Claims, 3 Drawing Figures

UNILATERALLY ALTERNATING BACKLASH TORQUE LOCK

BACKGROUND OF THE INVENTION

1. Field of the Invention

The invention concerns a unilaterally alternating backlash torque lock for mechanical control elements, couplings and the like, particularly for the steering gear of directly steered vehicles, such as fork lifts, industrial floor vehicles, etc., comprising an actuating member, a control and braking member. More particularly, the invention relates to an improved braking member comprising a single spring surrounding a control element and a slotted cylindrical sleeve. The loop spring is adjacent at its ends with a power transfer part (or controlled member) and rests with its outer surfaces in a loosely sliding arrangement against a sleeve which communicates with an actuating member and is fixedly mounted on a frame.

2. Background Art

In mechanical torque transmitting systems, wherein the part driving the control element is exposed to backlash by the part being controlled, so-called laterally acting or unilaterally alternating torque locks are used. Torque locks of this type serve in fork lifts, equipped with direct ratio steering gears to brake back-lashing torque impacts caused by roughness of the road or other obstacles. As an example, impacts occurring at the steered wheels are transmitted by means of the steering column directly back to the direct steering means used in these vehicles and may attain strengths capable of inflicting severe injuries to hands, even in the case of low impact velocities. In steering brakes necessary for this type of utility, a loop spring often acts as the effective braking part. It is arranged between the outer part of the hub connected with the steering column as the actuating member and the inner part of the hub fastened to the steering column tube and acting as the brake drum. The inner part of the hub is also fixedly attached to a frame member.

In a known steering brake of this type, a single part loop spring is provided as the effective brake part. The spring is equipped for the purpose of fastening it to the outer part of the hub with a recessed groove each in its center area and its ends, and a pivot which is securely attached to the flange of the outer part of the hub surrounded by the spring engaging each of the grooves. This known steering brake has certain severe disadvantages. One disadvantage is that partial embossing of the loop spring is required for the formation of the grooves and represents an undesirable weakening of the spring, particularly since the groove located in the center area may be applied only by means of highly complex and thus expensive equipment. Another substantial disadvantage consists in the fact that the axial mounting of the loop springs onto the power transmission part is effected over a protruding driving pin secured to the power transmission part requiring extensive spreading of the spring during the mounting operation. This makes it necessary to use a spring material soft enough to permit such spreading. A spring of such low coiling strength then augments the disadvantage of the reduction in cross section resulting from the application of a groove in the spring.

SUMMARY OF THE INVENTION

It is, therefore, an object of the present invention to provide a unilaterally alternating torque backlash lock mechanism that overcomes the disadvantages of prior art single part loop spring braking parts. The invention comprises a control element having a hub member and a housing member surrounding the hub member. The hub member is equipped with a sleeve curving at a distance around a bearing member (or inner hub member). The sleeve does not completely surround the bearing member, but rather displays a slot-like area running its entire length, thus forming a drive slot. A spring is wound around the bearing member and is so designed that each of the spring ends form a peg-like member bent down radially in the outward direction. Each of these peg-like members abut with some clearance against one of the edges of the slot in the sleeve on one side and against a cam-like member on the other side.

The cam-like member is formed on the inside surface of the housing and is of sufficient dimensions to extend into the slot-like area of the sleeve.

The invention thus provides a loop spring torque lock with a simple and easily manufactured effective braking part. The installation of the torque locking mechanism consists of simply sliding, in sequence, the loop spring, the hub member and the housing member onto the bearing member, whereby the members may be manufactured in a simple manner on a production line. More specifically, the loop spring forming the effective part of the device is produced with extraordinary simplicity by merely bending the ends of the spring in the radially outward direction on a mandrel, whereby the necessary peripheral distance of the pegs of the spring, determined by the width of the drive slot in the sleeve, may be maintained with great accuracy. Because the effectiveness of the spring is based not on spreading, but on its winding around the bearing part located on the inside, the utilization of narrow tolerances is possible, resulting in an accelerated response and enhanced efficiency of the backlash lock. As a result of the design of the loop spring according to the invention, installation no longer requires forcing the springs over protruding parts so that practically unlimited thicknesses of the spring may be chosen. The loops of the spring themselves are not weakened anywhere.

In another embodiment of the invention, the cam may be advantageously designed in a stepped manner so that in part the circumference of the sleeve is larger, while partially overlapping the drive slot for the pegs of the spring, than in the area of the guidance of the pegs. In this manner, direct driving contact of the cam and the sleeve begins after only a slight rotation. The adjusting force introduced is transmitted from the housing member to the hub member by means of the spring peg, but directly. The spring pegs do not take part in the transmission of the force, rather force transmission is effected directly between the cam and the hub member with a concurrent reduction in unit pressure.

A preferred embodiment of the invention is demonstrated in the drawing attached hereto.

Figure 1:
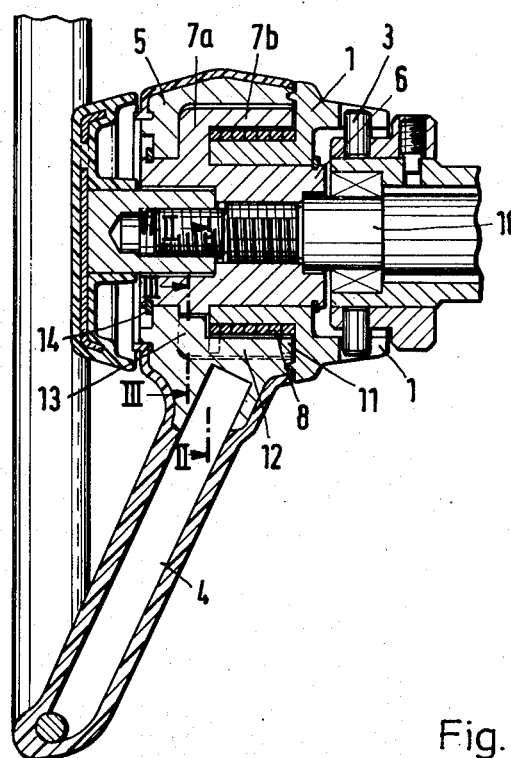
FIG. 1 shows a cross section of a unilaterally alternating torque backlash lock as an example of a steering brake for vehicles.
Figure 3:
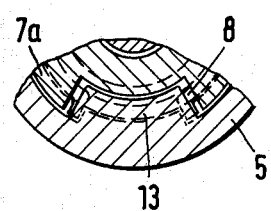
FIG. 3 depicts a cross section by II—II through FIG. 1.
Figure 2:
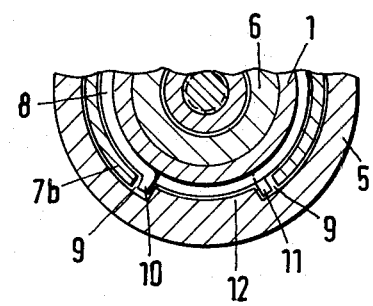
FIG. 2 illustrates a cross section according to I—I through FIG. 1.

In FIG. 1 of the drawing, 1 identifies the inner member of the hub (also referred to as the lower member) of the steering wheel as the bearing member. This member is secured rigidly by means of a securing ring 2 to the tube (not shown) of a steering column. The hub member 1 and the securing ring 2 are interconnected positively by means of the cylindrical pin 3. The outer member part of the hub consists of two parts, the housing 5 and the hub 6 (see FIG. 2). This outer part (also referred to as the upper member) acts on the steering column, not shown, as the adjusting member. The housing member 5 carries the spokes 4 of the steering wheel. The hub member 6 protrudes partially into the internal bore of the inner member of the hub and is partially enclosed by the housing member 5. The hub member 6 comprises a sleeve 7a, 7b surrounding the inner member 1 of the hub. Hub member 6 also forms an annular space to receive a spring 8 wound around the inner member 1 of the hub. As shown in FIG. 2, the sleeve is not a unitary cylinder completely surrounding the inner hub member but rather is absent a portion of its cylindrical surface forming thereby a slot-like area along the entire length of the sleeve, i.e. including the flange-like portion 7a. The slot-like or cutout portion of sleeve 7b is hereinafter referred to as slot 9 extending over the entire length of the sleeve. Also as demonstrated in FIG. 2, the radially outwardly bent terminal pegs 10, 11 of spring 8 unilaterally abut against the edges formed by sleeve 7b with a certain clearance. Housing member 5 displays a cam 12 extending over the entire length of the sleeve. The cam also protrudes between the two pegs 10 and 11 into the slot 9, filling the slot for the most part but forming a slot-like area on each side adjacent the sleeve 7a and 7b. Each of these slit-like areas provide a sufficient area for receiving one of the spring pegs 10 and 11, respectively, protruding into the slit-like area with a certain bilateral clearance.

The cam is designed in a stepped manner and has in addition to the cam 12 extending between the pegs 10, 11 in the plane of the flange member 7b shown in FIG. 2, a larger portion 13 extending beyond the adjacent spring pegs 10 and 11 partially covering the two slit-like areas while maintaining a slight clearance toward the flange part 7a.

The advantageous feature of the extraordinarily simple assembly of the unilaterally, alternating backlash torque lock is demonstrated by the following. Initially, the hub member 6 is pushed into the housing member 5 so that the stepped cam 12, 13 of the housing member 5 protrudes into the longitudinal slot 9 of the sleeve 7a, 7b. As shown in FIG. 1, the two parts are then secured in their axial position with respect to each other by means of a fastening ring 14 (Seeger type). The spring 8 is then slid onto the inner or lower member 1 of the hub. Subsequently the inner member 1 of the hub with the spring 8 installed upon it, is pushed into the opening so that the two spring pegs 10, 11 are positioned one each on either side of the cam 12. After the securing in position of the inner hub member 1 by means of a fastening ring 15 (also Seeger type), the peg 10 abuts against the portion 13 of the cam and the peg 11 against the inner member 1 of the hub, which may now be fastened by means of the securing ring 2 on the fixedly mounted tube of the steering column. The steering spindle itself protrudes through the center bore 16 into the area of hub member 6 and is connected with the latter in a suitable, known manner (for example, as shown in co-pending application Ser. No. 023,476 filed Mar. 23, 1979).

The device operates in the following manner:

In operation the unilaterally alternating backlash torque lock functions as follows.

A torque impact representing a backlash originating in the wheel being steered is transmitted by means of the hub member 6 and responds from there, depending on the direction of rotation of the backlash and after overcoming the clearance (through the sleeve 7b, FIG. 2) from the outside on one of the pegs 10 or 11. The spring 8 is thereby placed under stress while contracting around the inner or lower member of the hub. Thus, the torque impact backlashing from the steering mechanism is contained without slipping. In the case of action in the reverse direction, a rotation of the steering wheel will initially cause the cam 12 to slightly spread the spring 8 and thus to nullify the braking effect, whereupon the cam 13 will impact the flange portion 7a of the sleeve and carry along the part of the hub in order to transmit the steering force. There is therefore no impairment of the transmission of the steering force in either of the two directions, whereby the transmission of the steering force is effected not by means of the spring pegs 10 and 11, respectively, but over the enlarged lateral surfaces of the cam 13 and the flange portion 7a, respectively.

What is claimed is:

1. A unilaterally alternating backlash torque locking mechanism comprising:
   a housing member having a cam protruding inwardly;
   a slotted cylindrical sleeve member having a slotted cylindrical portion and a slotted flange portion to receive said cam with a certain clearance;
   a fixedly mounted inner hub member substantially surrounded by said sleeve member in spaced relationship to form an area between said inner hub and sleeve member;
   a spring wound around said inner hub member in said area and turning radially inward at its end portions to abut against said housing member, cam and sleeve member in the clearance space formed by the relationship of said cam in said slot,
   wherein the cam is in a stepped configuration having a greater circumference in the area of said flange portion of said sleeve and extending at least partially into the area of said clearance space.

2. The unilaterally, alternating backlash torque locking mechanism of claim 1 wherein the relationship of said cam and said slotted cylindrical sleeve forms two longitudinal guide slits, each slit suitable for accepting one end portion of said spring.

3. The unilaterally alternating backlash torque locking mechanism of claim 2 wherein the inner hub member is mounted on the steering column of a vehicle.

4. The unilaterally alternating backlash torque locking mechanism of claim 3 wherein the vehicle is an industrial vehicle.

5. The unilaterally alternating backlash torque locking mechanism of claim 3 wherein said inner hub member is in communication with the steering mechanism of a vehicle.

6. The unilaterally alternating backlash torque locking mechanism of claim 2 wherein said housing is an integral part of a steering wheel.

7. The unilaterally alternating backlash torque locking mechanism of claim 3 wherein said inner hub member is fixedly mounted on said steering column by means of cylindrical pins.

8. The unilaterally alternating backlash torque locking mechanism of claim 5 wherein said wound spring tightens against said inner hub member upon impact in the steering mechanism.

* * * * *